(12) United States Patent
Wilson et al.

(10) Patent No.: US 6,732,518 B1
(45) Date of Patent: May 11, 2004

(54) HYDRAULIC BRAKE BOOSTER

(75) Inventors: Robert K. Wilson, Granger, IN (US);
William J. Penninger, Niles, MI (US);
Timothy J. Albert, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/307,791

(22) Filed: Dec. 2, 2002

(51) Int. Cl.$^7$ ................................................ B60T 13/20
(52) U.S. Cl. ........................................ 60/547.1; 60/555
(58) Field of Search ............................... 60/547.1, 551, 60/552, 553, 555

(56) References Cited

U.S. PATENT DOCUMENTS

| | | | | |
|---|---|---|---|---|
| 4,117,766 A | * | 10/1978 | Kervagoret | ................ 91/391 R |
| 4,281,585 A | * | 8/1981 | Runkle et al. | ............. 91/391 R |
| 4,539,892 A | * | 9/1985 | Mackiewicz et al. | ....... 60/547.3 |
| 4,625,515 A | * | 12/1986 | Myers et al. | ................... 60/551 |
| 4,940,290 A | * | 7/1990 | Nishii et al. | ................ 60/547.1 |
| 4,986,613 A | * | 1/1991 | Nishii et al. | ................ 60/547.1 |
| 5,065,573 A | * | 11/1991 | Nomura et al. | ............. 60/547.1 |
| 5,065,580 A | * | 11/1991 | Nishii | ......................... 60/547.1 |
| 5,142,865 A | * | 9/1992 | Sakakihara et al. | ............ 60/555 |
| 6,203,119 B1 | * | 3/2001 | Towers et al. | ............ 303/114.1 |
| 6,561,596 B2 | * | 5/2003 | Penninger et al. | .......... 60/547.1 |

* cited by examiner

Primary Examiner—Thomas E. Lazo (74) Attorney, Agent, or Firm—Leo H. McCormick, Jr.; Warren Comsfock (57) ABSTRACT

A hydraulic brake booster for use in a brake system having a housing with a power piston located in a first bore and a control valve located in a second bore. An input member is connected to the power piston and linked to the control valve by a lever arrangement. The input member is characterized by a cylindrical body with a shaft attached thereto. A bracket with a radial opening is carried by the shaft and urged toward a head on the shaft by a spring. The lever arrangement is characterized by a first lever with a first end pivotally secured in the housing by a first pin and a second end located in the radial opening of the bracket and a second lever pivotally secured at a fulcrum on the first lever by a second pin extending through the first and second levers. A first input force applied to the cylindrical body is transmitted through the spring into the bracket and communicated through the fulcrum point to bring a first end of the second lever into engagement with the control valve and a second end of the second lever into engagement with the power piston. The first input force as applied to the bracket causes the end of the first lever to pivot about the first pin and transmit an actuation force through the fulcrum into the said second pin to move said first end and activate said control valve to meter pressurized fluid into the working chamber to develop a hydraulic force for effecting a brake application. The lever arrangement ratio defined by a first length between the first pin and the second end on the first lever and a second length between the first pin and the second end of the second lever such that axial movement of the cylindrical body and the power piston is defined by this ratio and as a result a hydraulic force produced by the metered pressurized fluid proportional to a manual input force.

15 Claims, 7 Drawing Sheets

HYDRAULIC BRAKE BOOSTER

This invention relates to an input member and lever arrangement for use in a brake booster having several modes of actuation including a manual mode, a power assist mode, a combined power assist and manual mode and a traction mode in the development of an output force corresponding to a desired brake application.

BACKGROUND OF THE INVENTION

In hydraulic brake boosters of a type disclosed in U.S. Pat. Nos. 4,281,585; 4,539,892; 4,625,515; and U.S. application Ser. No. 09/894,106 filed Jun. 28,2001, a control valve is located in a first bore and a power piston is located in a second bore of a housing. A lever arrangement is connected to the power piston and the control valve. An input force applied to a brake pedal by an operator acts on the lever arrangement. The lever arrangement pivots on the power piston and communicates an actuation force that moves the control valve to regulate the flow of pressurize fluid from a source to an operational chamber. The regulated pressurized fluid supplied to the operational chamber acts on the power piston to develop an operational force that pressurizes fluid in the first bore that is supplied to wheel brakes to effect a brake application. A reaction force produced by regulated pressurized fluid in the movement of the power piston is transmitted back to the brake pedal to balance the input force such that the operational force supplied to move the power piston in the first bore is a linear function of the input force applied to the brake pedal.

Additional features such as traction control, dynamic operational control and anti-skid control have been added to hydraulic brake booster to provide a total brake system. However, in such brake systems the brake pedal of the hydraulic booster mirrors the movement of the power piston and as a result have not been incorporated in all vehicles. One way to hold a brake pedal stationary during such additional functions is disclosed by the structure in U.S. Pat. No. 6,203,119 wherein a control valve seat moves while the input member remains in a stationary position to meter operational pressurized fluid from a secondary source to effect a brake application.

SUMMARY OF THE INVENTION

A primary object of the present invention is to provide an input member and lever arrangement for a hydraulic brake booster in a brake system wherein the lever arrangement includes a first lever that is retained in a housing of the brake booster by a first pivot pin and joined to a second lever by a second pivot pin to communicate an operational force to a control valve whereby pressurized fluid is metered to a working chamber for the development of an operational force that is proportional to an input force applied to a brake pedal by the input member by an operator and communicated to the lever arrangement for effecting a brake application.

According to this invention, the hydraulic brake booster has a housing with a first bore therein separated from a second bore. The first bore retains the power piston while the second bore retains the control valve. The input member is connected to the power piston and linked to the control valve by a lever arrangement. The input member responds to a brake application force applied to the brake pedal by an operator by communicating a first input force to lever arrangement such that the lever arrangement moves and activates the control valve to meter pressurized fluid to a working chamber in the housing. The pressurized fluid in the working chamber acts on the power piston to develop a hydraulic force for pressurizing fluid in the first bore it is this pressurized fluid that is communicated to wheel brakes in the brake system to effect a corresponding brake application. The input member is characterized by a cylindrical body with a shaft attached thereto. The shaft has a head on a first end that is located in an axial slot bore in the power piston and a second end with threads thereon that are mated with threads in the cylindrical body. A bracket that is located on the shaft and is urged toward the head by a first spring such that a radial opening in the bracket is and remains perpendicular to the shaft. The lever arrangement is characterized by a single first lever with a first end pivotally secured to the housing by a first pin and a second end located in the radial opening of the bracket, and parallel first and second member of second lever with each member having a first end and a second end with the first pin passing through a slot in the first end. A second pin extends through the first and second levers to define a fulcrum point for the lever arrangement. A second spring is located between the power piston and the head of the shaft such that a return spring force is applied to the bracket and communicated through the fulcrum point to bring the first end of the parallel first and second members of the second lever into engagement with the control valve and the second end thereof into engagement with the power piston. The first input force is applied to the second end of the first lever through the engagement of the surface surrounding the radial opening in the bracket causing the second end to first lever to pivot about the first pin and transmit an actuation force through the fulcrum into the second lever. The actuation force acts on the second lever causing the first end of the first and second members to move and activate the control valve whereby metered pressurized fluid is communicated into the working chamber for effecting the brake application. The lever arrangement is characterized in that a first length is defined by a distance between the first pin and the second end on the first lever and a second length is defined by a distance between the first pin and the second end of the first and second members of the second lever. The ratio of the first length to the second length corresponds to a difference in axial movement of the cylindrical body and the power piston and corresponds to proportional relationship of the input force applied to the brake pedal and the hydraulic force produced in the working chamber in effecting a brake application. The lever arrangement is also responsive to a force directly applied to the first end of the first and second members of the second lever to effect a brake application under the control of a ECU to provide to independent braking of a vehicle and reduce the speed of the vehicle to a safe operating level as evaluated by input signals transmitted to the ECU relating to current operating condition of the vehicle.

An advantage of this invention resides in a brake booster having a lever arrangement that directs an input force applied to a brake pedal to actuate a control valve such that the linear movement of a power piston is proportional to an input force applied to effect a brake application.

A further advantage of this invention resides in a lever arrangement whereby a first input force corresponding to an operator brake request or a second input force corresponding to a ECU request is communicated through a lever arrangement to meter pressurized fluid that acts on a power piston to pressurize fluid that is communicated to wheel brakes in a vehicle to effect a brake application.

DETAILED DESCRIPTION

Figure 1:
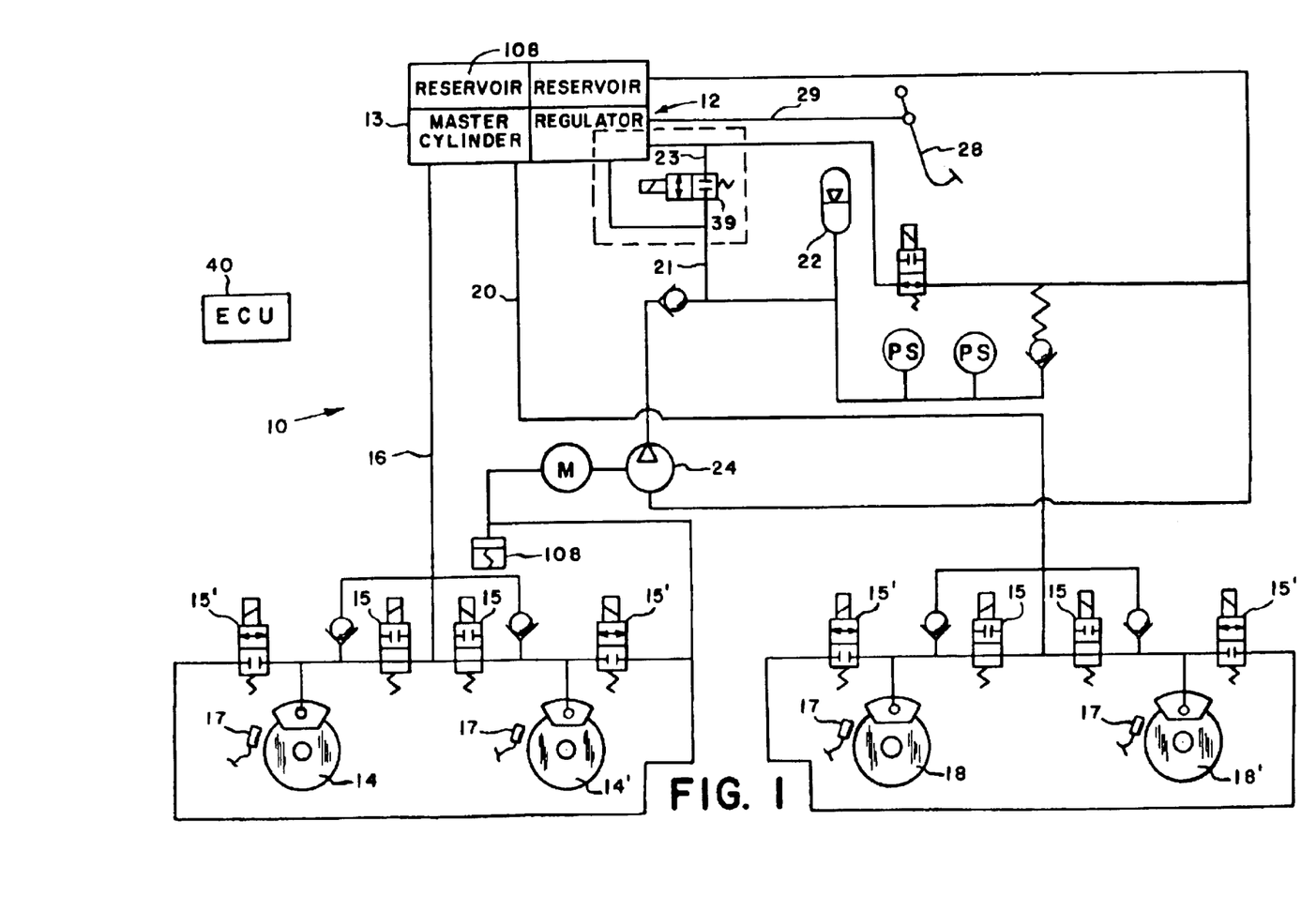
FIG. 1 is a schematic illustration of a brake system that includes a hydraulic brake booster made according to the principals of the present invention.

The brake system 10 as shown in FIG. 1 includes a hydraulic brake booster 12 for supplying a master cylinder 13 with an operational force to pressurized fluid that is thereafter supplied to a first set of wheel brakes 14,14' by a first conduit 16 and to a second set of wheel brakes 18,18' by a second conduit 20 to effect a brake application. The hydraulic brake booster 12, which is commonly referred to as a closed center booster, receives pressurized supply fluid a source, either directly from pump 24 or an accumulator 22 that is charged and maintained a predetermined fluid pressure level by pump 24.

The brake booster 12 performs in several modes of operation including a manual mode, a boost mode, a boost plus manual mode and a traction control mode. In the manual mode a brake force transmitted directly from the brake pedal 28 to act on the pistons in the master cylinder 13, in the boost or first mode a control valve 60 is selectively activated by a brake force input applied through a brake pedal 28 by an operator, in the boost plus manual mode, once hydraulic run out is reached, a manual input is added to further develop pressurized fluid to effect a brake application and in the traction control or second mode a solenoid 39 is activated by the ECU 40 to activated the control valve 60 whereby pressurized fluid from a source is supplied to a working chamber 80. In both the boost modes and traction control mode the pressurized fluid in the working chamber 80 directly acts on a power piston 50 to develop an operational force that pressurizes fluid in the master cylinder 13 to effect a corresponding brake application.

Figure 5:
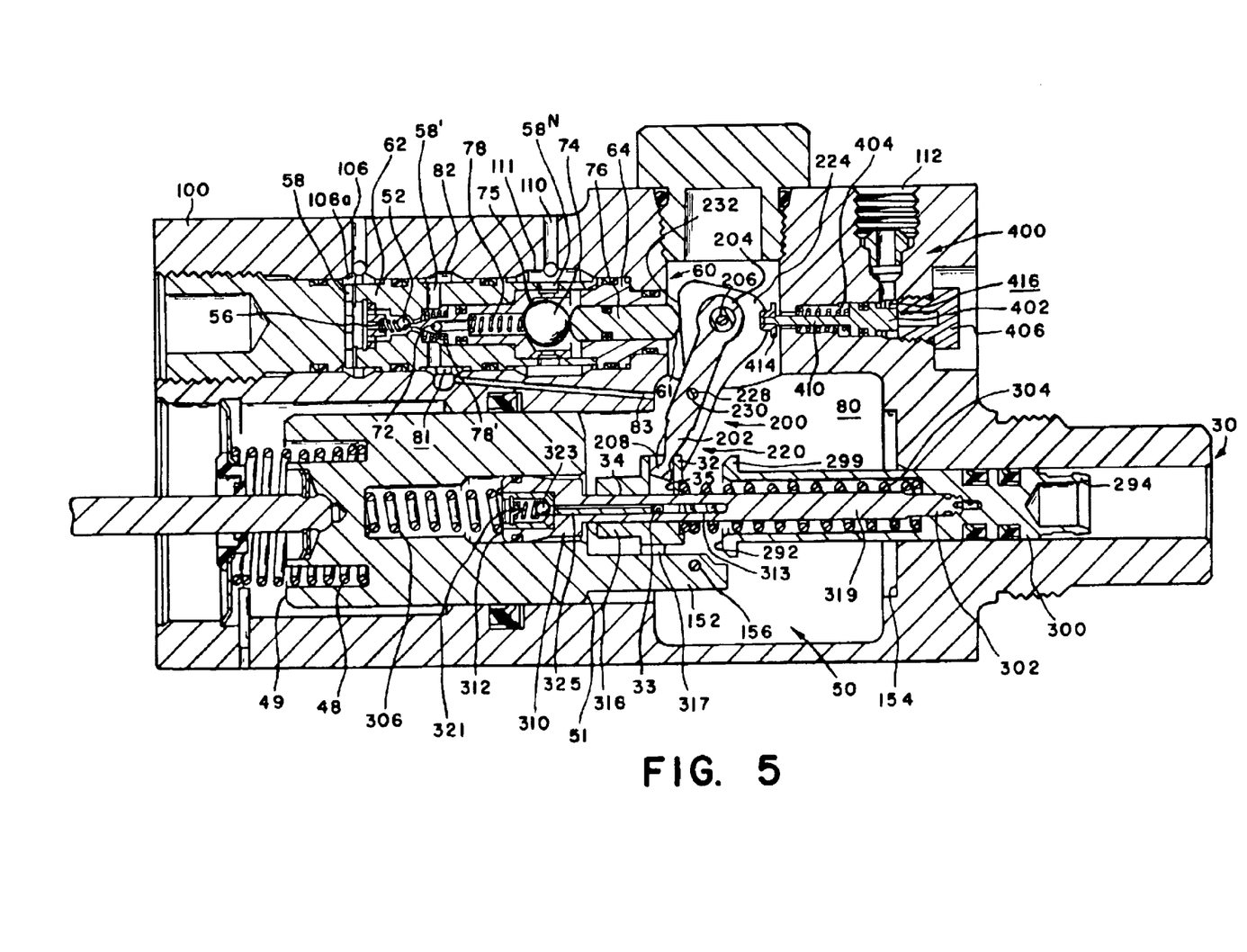
FIG. 5 is a sectional view of the hydraulic brake booster of FIG. 2 in an actuation condition corresponding to a maximum output achieved by a pressurized fluid from a source.

In the manual or first mode, the development of a hydraulic actuation force in brake booster 12 is under the control of an operator. The operator applies a brake force to the brake pedal 28, corresponding to a desired braking event, and this brake force is communicated through a lever arrangement 200 to activate the control valve 60. When activated the control valve 60 meters pressurized fluid that is supplied to the working chamber 80 to develop a corresponding actuation force on the power piston 50 for moving pistons in the master cylinder 13 and pressurized fluid in the master cylinder 13 that is supplied to operate wheel brakes 14,14' and wheel brakes 18,18' and effect a brake application, in a manner as illustrated in FIG. 5. On termination of the brake force by the operator to brake pedal 28, the components of the brake booster 12 are returned to a rest state as illustrated in FIG. 2.

In the traction control or second mode, the brake system 10 is under the control of the ECU 40 and the system includes at least the following components: a build solenoid valve 15, a decay solenoid valve 15' and a wheel speed sensor 17 for each wheel in the first set of wheel brakes 14,14' and second set of wheel brakes 18,18'. Each of the wheel speed sensors 17 provide the electronic control unit (ECU) 40 with an input signal relating to a current functional operation of a particular wheel of the vehicle and are evaluated with other inputs and data relating to the vehicle including but not limited to: the operation of the motor pump; the pressure of the pressurized supply fluid; dynamic forces experienced by the vehicle; accumulator fluid supply pressure, the level of fluid in a reservoir and etc that may effect the safe operation of the vehicle and the ability of achieving a desired braking application. If the ECU 40 determines after evaluating the inputs relating to the operational features or conditions currently experienced by the vehicle that a less than optimum operation situation is occurring or forthcoming, the ECU 40 is programmed institute independent braking of the wheel brakes 14, 14' and 18,18' by transmitting an operating signal that opens normally closed solenoid 39. When solenoid 39 is opened pressurized hydraulic fluid flows from the accumulator 22 and to activate a hydraulic actuator 400 to directly activate the control valve 60 of the hydraulic brake booster 12. Once control valve 60 is activated, pressurized hydraulic fluid is communicated to working chamber 80 and acts on the power piston 50 to create an operational force that in turn acts on pistons in the master cylinder 13 to produce pressurized fluid that is supplied to individually activate the wheel brakes 14, 14' and 18,18' in accordance with signals from the ECU 40 to effect a brake application and attenuate the less than optimum operating condition which could effect the safe operation of the vehicle.

Figure 2:
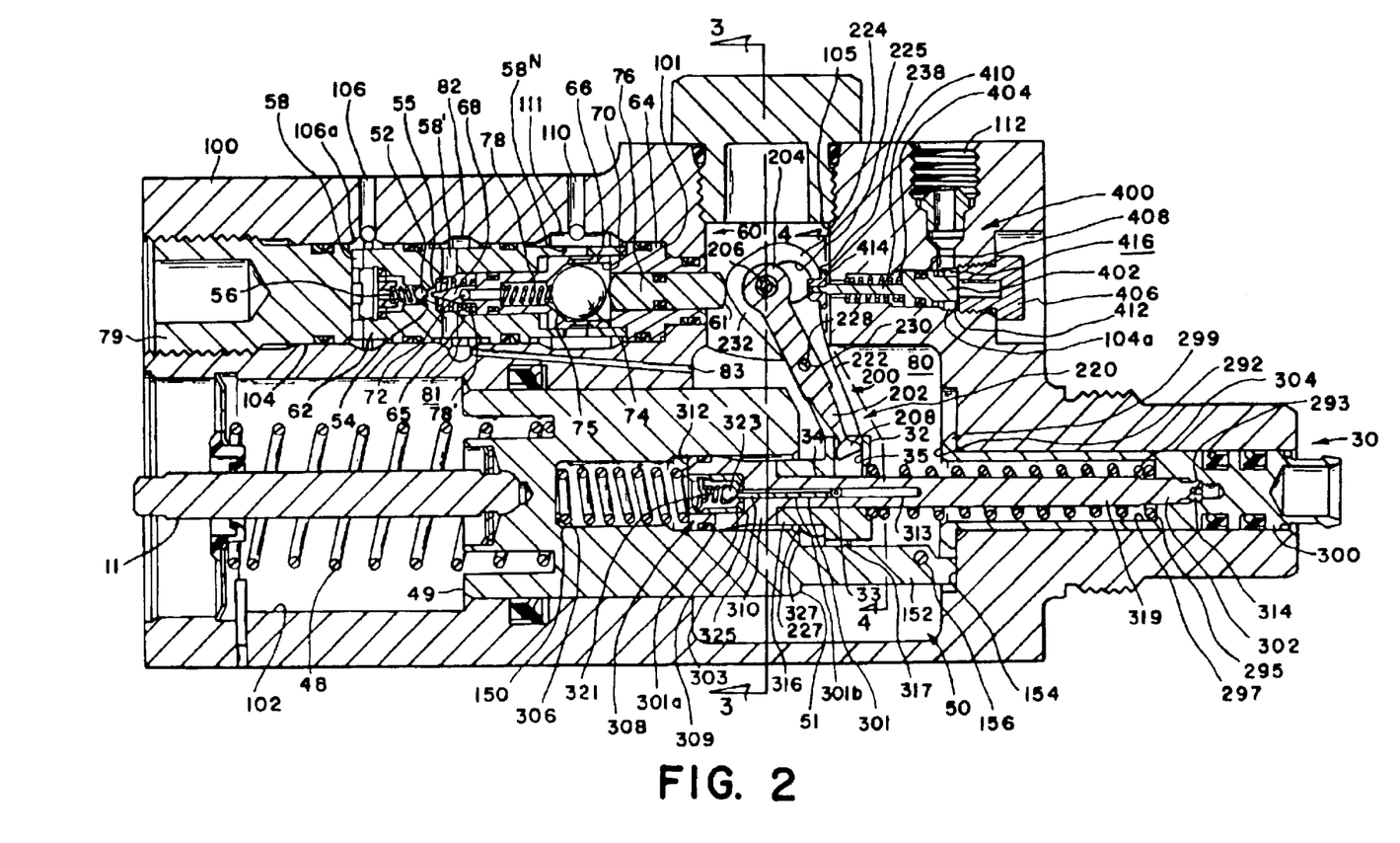
FIG. 2 is a sectional view of the hydraulic brake booster of FIG. 1 in a rest condition.
Figure 3:
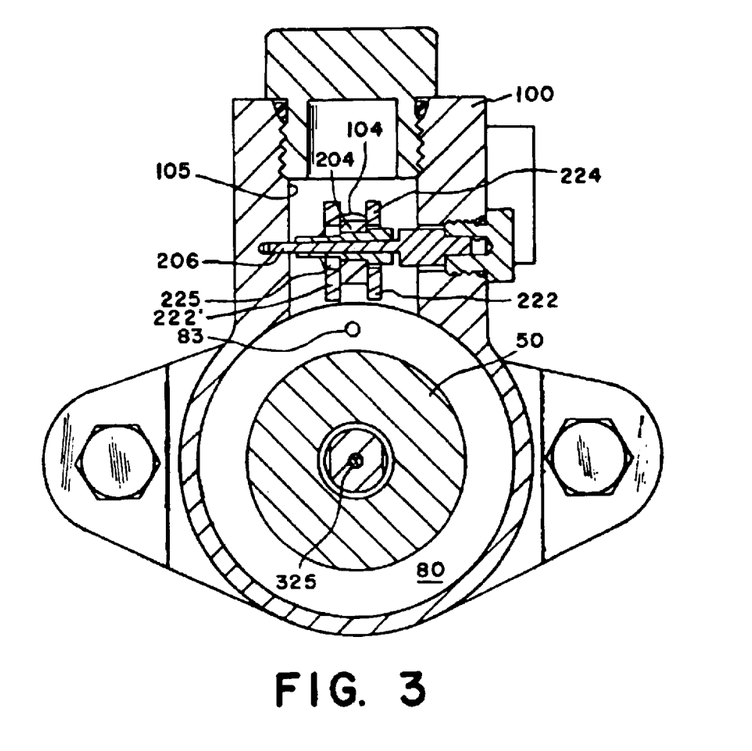
FIG. 3 is a sectional view taken along line 3—3 of FIG. 2.
Figure 4:
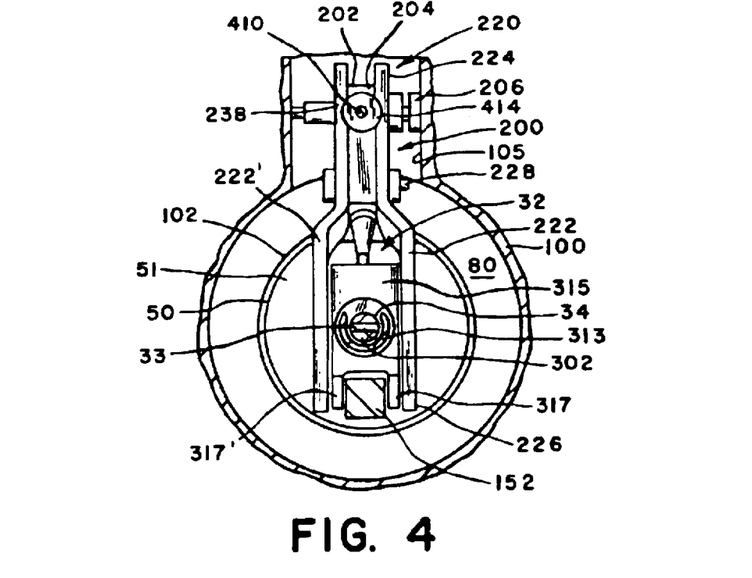
FIG. 4 is a sectional view taken along line 4—4 of FIG. 2.

The hydraulic brake booster 12 is best shown in FIGS. 2, 3 and 4 includes a housing 100 with a power piston 50 that is sealingly retained in a first bore 102 and a control valve 60 that is sealingly retained in a second bore 104 therein with an input member 30 connected to the power piston 50 and linked to the control valve 60 by the lever arrangement 200. In the boost or first mode, the lever arrangement 200 is responsive to a braking input force that is communicated from a brake pedal 28 to the input member 30 for moving the control valve 60 that meters pressurized fluid from a source, either pump 24 or accumulator 22. The metered pressurized fluid is communicated to a working chamber 80 in housing 100 and acts on the power piston 50 to develop a hydraulic actuation force that in turn acts on piston in the master cylinder 13 to pressurize fluid therein that is communicated to the wheel brakes 14, 14' and 18,18' in a brake system 10 for effecting a corresponding brake application.

In more particular detail, the housing 100 includes a first inlet port 106 connected to supply conduit 21 for receiving pressurized hydraulic fluid either directly from pump 24 or from accumulator 22; a relief port 110 connected to a common reservoir 108 for pump 24 and master cylinder 13 and a second inlet port 112 connected to supply conduit 21 by conduit 23 through a normally closed solenoid 39 under the control of ECU 40. The housing 100 has a stepped first bore 102 that extends clear through the housing 100, a stepped second bore 104 that is parallel with the first bore 102 and extends into the housing 100 from a first side until it intersects with a cross bore 105 that extends from the working chamber 80, and a stepped third bore 104a is in axial alignment with bore 104 that extends from a second side of the housing until it also intersects with cross bore 105. Housing 100 has a first groove 106a through which first inlet 106 is connected to the second bore 104, a second groove 111 through which the second bore 104 is connected to the reservoir 108 and a third groove 82 through which the second bore 104 is connected by passage 83 to the working chamber 80.

The control valve 60, functions in a manner similar to the control valve disclosed in U.S. Pat. No. 4,117,766 and includes a first cylindrical body 62 and a second cylindrical body 64 that are sealingly located the second bore 104. An end plug 79 that is fastened by being screwed into housing 100 holds the second cylindrical body 64 against a shoulder 101 in the housing 100 to correspondingly align radial passages 58,58'. . . 58" that extend from a stepped bore 65 in the first cylindrical body 62 with groove 106a and inlet port 106, with groove 82 and control passage 83 and with groove 111 and relief port 110. The control valve 60 further includes a sleeve 66 concentrically located within bore 65 of cylindrical body 62. Sleeve 66 has an integral axial projection 68 that functions as a needle valve within the stepped bore 65 of the first cylindrical body 62. The sleeve 66 in turn has a stepped axial bore 70 that terminates in a cross bore 72 adjacent the axial projection 68. Bore 70 retains a first ball 74 that is urged into engagement with an actuation pin 76 retained in the second cylindrical body 64 by a first return spring 78 while a second return spring 78' urges the sleeve 66 into engagement with the second cylindrical body 64. The control valve 60 further includes a second ball 52 that is located in the stepped bore 65 and urged toward a seat 54 formed on land 55 by a spring 56. Land 55, radial passage 58', groove 82 and the end of sleeve 66 define a volume that functions as a supply chamber 81 for supply conduit 83. When spring 56 urges ball 52 against seat 54, communication between inlet port 106 and passage 83 is inhibited while at the same time communication between passage 83 and relief port 110 is uninhibited by way of cross bore 72, axial bore 70 as return spring 78 urges ball 74 away from seat 75 in sleeve 66.

The power piston 50 is sealingly located in the first bore 102 and urged toward the working chamber 80 by a return spring 48. The power piston 50 has a first end 49 and a second end 51 with a generally circular shape with a rectangular projection 152 that extends from the second end 51 into the working chamber 80. Return spring 48 acts on the first end of the power piston 50 and urges the power piston toward the working chamber 80 until an end surface 154 on projection 152 engages housing 100 to define a rest position for the power piston 50. A bracket 32 that straddles the projection 152 is retained on the projection 152 by a pin 33 that passes through an axial slot 313 in a shaft 302 on the input member 30 while a radial pin 156 extends through projection 152 to define a stop to limit the axial movement of the bracket 32 with respect to the shaft 302. The power piston 50 has a blind axial bore 150 that extends from the second end 51 toward the first end 49 and forms an extension for the working chamber 80.

The input member 30 includes a cylindrical body 300 that is sealingly located in the first bore 102, a shaft 302 that is connected to the cylindrical body 300, a first spring 304 that is concentric to the shaft 302, bracket 32 that is carried on shaft 302, a second or return spring 306 that acts on shaft 302 to urges the cylindrical body 300 toward a position of rest and a ball valve assembly 308. The cylindrical body 300 has a radial lip 299 on a first end 292 that engages housing 100 to retains the cylindrical body 300 within housing and an indentation 293' on a second end 294 for receiving a push rod 29 that is connected the brake pedal 28. Cylindrical body 300 has a stepped axial bore 297 that extends from the first end 292 to a shoulder 295 adjacent the second end 294 with a portion 293 of bore 297 threaded to receive a threaded second end 314 of shaft 302. In addition to the threaded second end 314, shaft 302 has a head 310 on a first end 312 that is located in axial bore 150 of piston 50 and a smooth cylindrical surface 319 that extends from head 310 to the threaded second end 314. 241 The bracket 32 has a general rectangular shaped base 315, see FIG. 4, with a cylindrical projection 316 and parallel arms 317,317' that extend therefrom. An axial bore 34 extends through the cylindrical projection 316 and base 315 of bracket 32 to receive shaft 302 while the first and second arms 317,317' define guides that are aligned with the sides of projection 152. The rectangular base 315 of bracket 32 has a radial opening 35 that is retained in perpendicular plane with respect to projection 152 by the arms 317,317' and pin 33 that extends though a slot 313 in shaft 302. Bracket 32 is capable of axial movement on shaft 302 through which an input force is applied to the end 208 of lever 202 along a radial plane with respect to the axis of the first bore 102. When the threaded second end 314 of shaft 302 is screwed into corresponding threads 293 in the cylindrical body 300 spring 304 is compressed and as a result spring 304 provides a force that urges bracket 32 toward and into engagement with head 310. The shaft 302 is characterized by a stepped axial bore 301 that extends from the first end 312 to the radial slot 313 that receives pin 33 to limit the relative movement of bracket 32 on the smooth cylindrical surface 319 of shaft 302. The axial bore 301 in shaft 302 has a first diameter 301a adjacent the first end 312 of shaft 302 that terminates at a shoulder 303 that has a surface that defines a seat 309 within shaft 302 and a smaller diameter 301b. Ball valve arrangement 308 includes a spring 321 and ball 323 that are located in the first diameter 301a and a pin 325 that is located in the smaller diameter 301b of shaft 302. Pin 325 has a smaller diameter than diameter 301b of bore 301 and a length that is longer that a distance between seat 309 and radial slot 313 such that when bracket 32 is against head 310 of shaft 302, a first end of pin 325 engages pin 33 on bracket 32 and a second end of pin 325 engages ball 323 to hold ball 323 off seat 309 as shown in FIG. 2. With ball 323 off of seat 309 fluid communication occurs between axial bore 150 and working chamber 80 by way of radial slot 33 and axial bore 301. Spring 321 acts on ball 323 to maintain contact with the second end of pin 325 and urge ball 323 toward seat 309 and into engagement thereof during a manual input being applied to the power piston 50.

The lever arrangement 200 includes a first lever 202 and a second lever 220 made up of parallel arms 222,222'. The first lever 202 has a first end 204 pivotally secured in housing 100 by a first pivot pin 206, see FIG. 3, and a second end 208 with a semi-spherical surface located in the radial opening 35 of bracket 32. The parallel arms 222,222' of the second lever 220 each have a first end 224 and a second end 226 with the first pin 206 passing through an elongated oval slot 225 in the first end 224 and the second end 226 being aligned with the second end 51 on the power piston 50. The second lever 220 is connected to the first lever 202 by a second pivot pin 228 that sequentially extends through the first arm 222, first lever 202 and second arm 222' at a fulcrum point 230 on the first lever 202. The first end 224 of the parallel arms 222,222' have a cam surface 232 that engages face 61 on actuation pin or cylindrical body 76 of the control valve 60 at a point contact while the second end 226 of the parallel arms 222,222' have an arcuate surface 227 that define a point contact with the second end 51 of piston 50 such that return spring 306 transmits a force through bracket 32 to end 208 of the first lever 202 to hold the cam surface 232 against face 61 and arcuate surface 227 against end 51 on the power piston 50. The fulcrum point 230 on lever 202 is selected such that as lever 202 pivots in an arc about pivot pin 206, an actuation force applied to the second lever 220 is balanced between the first end 224 and the second end 226.

The lever arrangement 200 has a first length defined by a distance between the first pin 206 and the second end 208 on the first lever 202 and a second length defined by a distance between the first pin 206 and the second end 226 of the second lever 220. The axial movement of the input member 30 and in particular the cylindrical body 300 and the power piston 50 is defined by a ratio of the first length to the second length and as a result a hydraulic force developed by pressurized fluid metered to the working chamber 80 through the actuation of the control valve is proportional to an input force applied to brake pedal 28. The first end 224 of the arms 222,222' of the second lever 220 are also characterized by a second cam or arcuate surface 238 on the back side thereof.

The brake booster 12 includes a hydraulic actuator 400 that is under the control of the ECU 40 to define the traction control or second mode of operation. The hydraulic actuation 400 includes a piston 402, a return spring 404 and an end cap 406. The piston 402 has a first diameter 408 that is sealingly located in bore 104a, a second diameter or projection 410 that extends into the cross bore 105 of working chamber 80 and a third diameter 412. The projection 410 has a collar or flange 414 thereon that engages cam surface 238 on the first end 224 of arms 222,222' of the second lever 220 while the return spring 404 urges the piston 402 toward the end cap 406 that engages housing 100 to seal bore 104a. The area in bore 104a between the first diameter 408 and end cap 406 defines an actuation chamber 416 that is connected by way of inlet port 112 to a source of pressurized fluid controlled by solenoid 39 in conduit 23.

Figure 8:
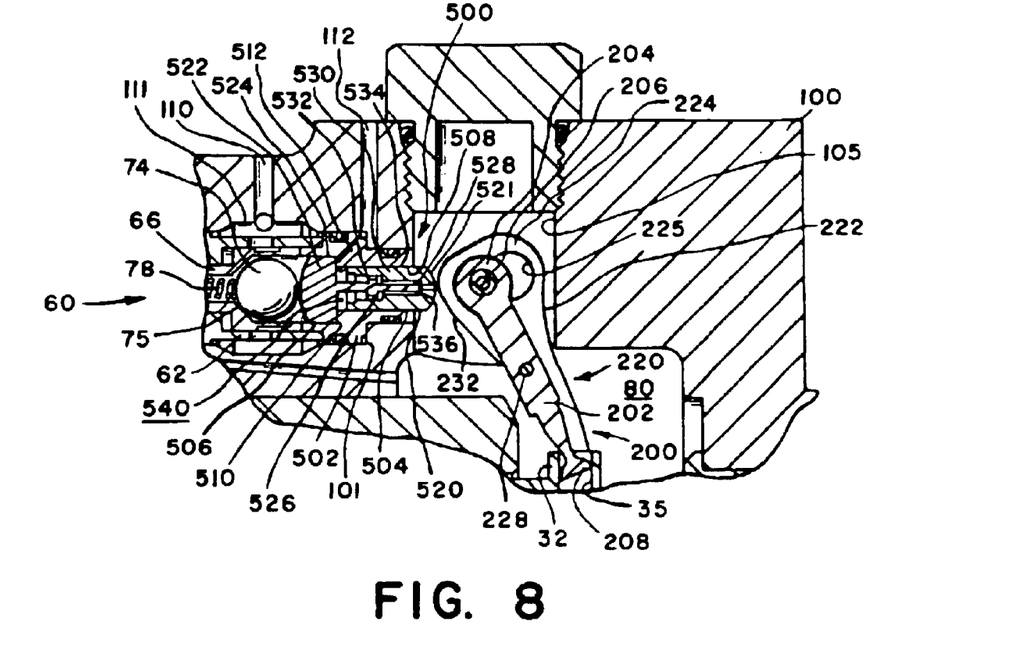
FIG. 8 is a sectional view of a second embodiment through which an ECU may activate the control valve of FIG. 2 to effect a brake application.

The brake booster hydraulic actuator 400 for implementing traction control in brake system 10 in brake booster 12 shown in FIG. 2 was modified to define a second hydraulic actuator 500 shown in FIG. 8. Only those components required to perform a traction control function are illustrated in FIG. 8 as the other component are the same as in FIG. 2 and include the housing 100 and the second cylindrical body 64 and actuation pin 76 of the control valve 60 of the brake booster 12. Specifically, the hydraulic actuator 500 has a second cylindrical body 502 that is held against shoulder 101 by the first cylindrical body 62 once end plug 78 is screwed into housing 100. Cylindrical body 502 has stepped bore 504 therein with a first diameter 506 separated from a second diameter 508 by a shoulder 510. Cylindrical body 502 has a passage 512 that connects stepped bore 504 with actuation passage 112 and conduit 23 that retains solenoid 39 under the control of ECU 40 for supplying pressurized fluid from a supply source. The actuation pin 520 includes a piston 522 and a stepped sleeve 530 located in the stepped bore 504. The piston 522 has a first diameter 524 that is sealingly located in diameter surface 506 of the stepped bore 504, a axially slotted second diameter surface 526 that engages a diameter 532 of bore 534 in sleeve 530 and a third diameter surface 528 that engages a slotted diameter surface 536 of bore 534 in sleeve 530. The piston 522 and sleeve 530 are located in cylindrical body 502 to define an actuation chamber 540 therein that is connected to passage 512. Controlled pressurized fluid under the control of the ECU 40 is selectively supplied to the control chamber 540 and acts on piston 522 to develop an actuation force for activating the control valve 60 to effect a brake application. The actuation chamber 540 is connected to the working chamber 80 in housing 100 by a controlled leak path defined by the second slotted diameter surface 526 in piston 522 and diameter 532 in sleeve 530 and the third diameter surface 528 on piston 522 and the slotted diameter surface 536 in sleeve 530. Return spring 78 acts on ball 74 to urge piston 522 toward shoulder 510 such that the end 521 of sleeve 530 engages the cam surfaces 232 on arms 222,222' of the second lever 200.

Operation of the Brake Booster

For a given vehicle, the operational force developed by an input force applied to a brake booster to meet operational braking parameters is effected by several factors including weight of the vehicle, size of the power piston in the brake booster and the available hydraulic fluid pressure developed by a source. Only after the parameters have been defined are the component parts that make up a brake system selected. For instance in a brake system equipped with a hydraulic brake booster 12, a gain or ratio is selected to define a relationship between the input force applied to the brake pedal 28 by an operator and the operational force developed by metering pressurized fluid to the working chamber 80 to act on a power piston 54. In the lever arrangement 200 for brake booster 12, the location of the fulcrum point 230 on the first lever 202 is selected such that a balanced force is applied to the first 224 and second 228 ends of the second lever 220 and in activating the control valve 60 to meter pressurized fluid to the working chamber 80. In this brake booster 12, the resulting hydraulic force applied to the power piston 50 is proportional to the input force applied by an operator to the input member 30 to effect a brake application.

Figure 9:
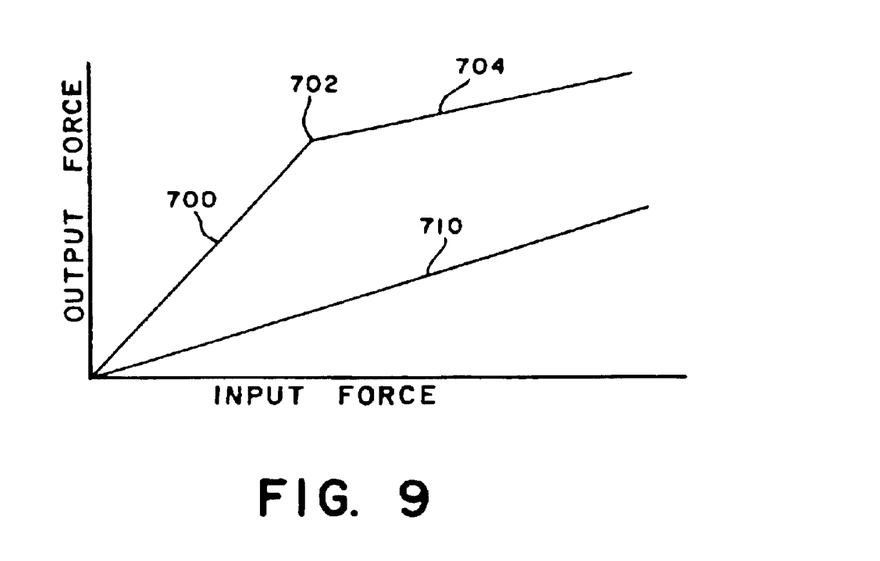
FIG. 9 is a graph showing the development of an output force by the brake booster of FIG. 1 under various operating conditions.

In more detail, when an operator desires to effect a brake application in a vehicle having a hydraulic brake booster 12 as shown in FIG. 2, an input force applied to brake pedal 28 that is communicated through input push rod 29 to move input member 30 that includes the cylindrical body 300, head 310 on stem 302 and bracket 32 all of which move in a direction toward power piston 50. Movement of the bracket 32 causes that end 208 of lever 202 to pivot about pin 206 and impart an actuation force through pin 228 at fulcrum 230. The actuation force at pin 228 is applied to the second lever 220 and applied through arms 222,222' such that one half of the actuation force is applied to end or face 61 on actuation pin 76 by way of cam surface 232 and the other half is applied to the second end 51 of the power piston 50 through surface 227 on the second end of the second lever 220. The actuation force applied to actuation pin 76 initially moves ball 74 into engagement with seat 75 to close communication between chamber 81 and relief port 110 by way of cross bore 72 and bore 70. Further movement of actuation pin 76 now moves sleeve 66 such that axial projection 68 engages ball 72 and moves ball 52 of seat 54 to allow metered pressurized supply fluid to flow into chamber 81 and be communicated through passage 83 into working chamber 80. The metered pressurized supply fluid in chamber 80 acts on the second end 51 of piston 50 and creates an operational force that is communicated through output push rod 11 to act on pistons in the master cylinder 13 and correspondingly pressurize fluid therein that is supplied through conduits 16 and 20 to effect a brake application in wheel brakes 14,14' and 18,18'. During a brake application the cylinder member 300 of the input member 30 and the power piston 50 move at different rates and as a result gap develops between head 310 and shoulder 151 in bore 150 as illustrated in FIG. 5. However, the relationship between the first end 224 of the second lever 220 and end 61 of actuation pin 76 remain substantially constant as slot 225 allows the cam 232 to move with respect to end 61 and the second end 227 to slide on the second end 51 of the power piston 50 as the fulcrum point 230 moves in an arc about pivot pin 206. Similarly, the input force applied to fulcrum point 230 remains in a direct function of the input force applied to brake pedal 28 as end 208 of the first lever 202 slides in radial opening 35 with axial movement of bracket 32 and cylindrical member 300 into the working chamber 80. The relationship of the input force applied to the input member 30 and the output force applied by push rod 11 to the master cylinder 13 is illustrated by curve 700 in FIG. 9. The hydraulic booster 12 functions in a manner described above until a maximum output force occurs, point 702 in FIG. 9, as a result of metered pressurized hydraulic fluid (hydraulic run out) being presented to working chamber 80.

The relationship of the component of brake booster 12 for hydraulic run out is illustrated in FIG. 5. At hydraulic runout, ball 52 is completely off seat 54 and the lever arrangement 200 is aligned such that bracket 34 separates from head 310. However, further operational force can now be achieved as an input force applied to cylindrical body 300 causes head 310 to slide in bore 150 but bracket 34 holds pin 33 stationery and as a result spring 321 moves ball 323 against seat 309 to seal axial bore 301 and trap fluid in bore 150. Now any additional input force that is applied to cylindrical body 300 is directly transferred into power piston 50 and added to the output force produced by the pressurized fluid in working chamber 80 to produce an output force as illustrated by line 704 above point 702 in FIG. 9. On termination of the input force the components return to the position illustrated in FIG. 2.

Figure 6:
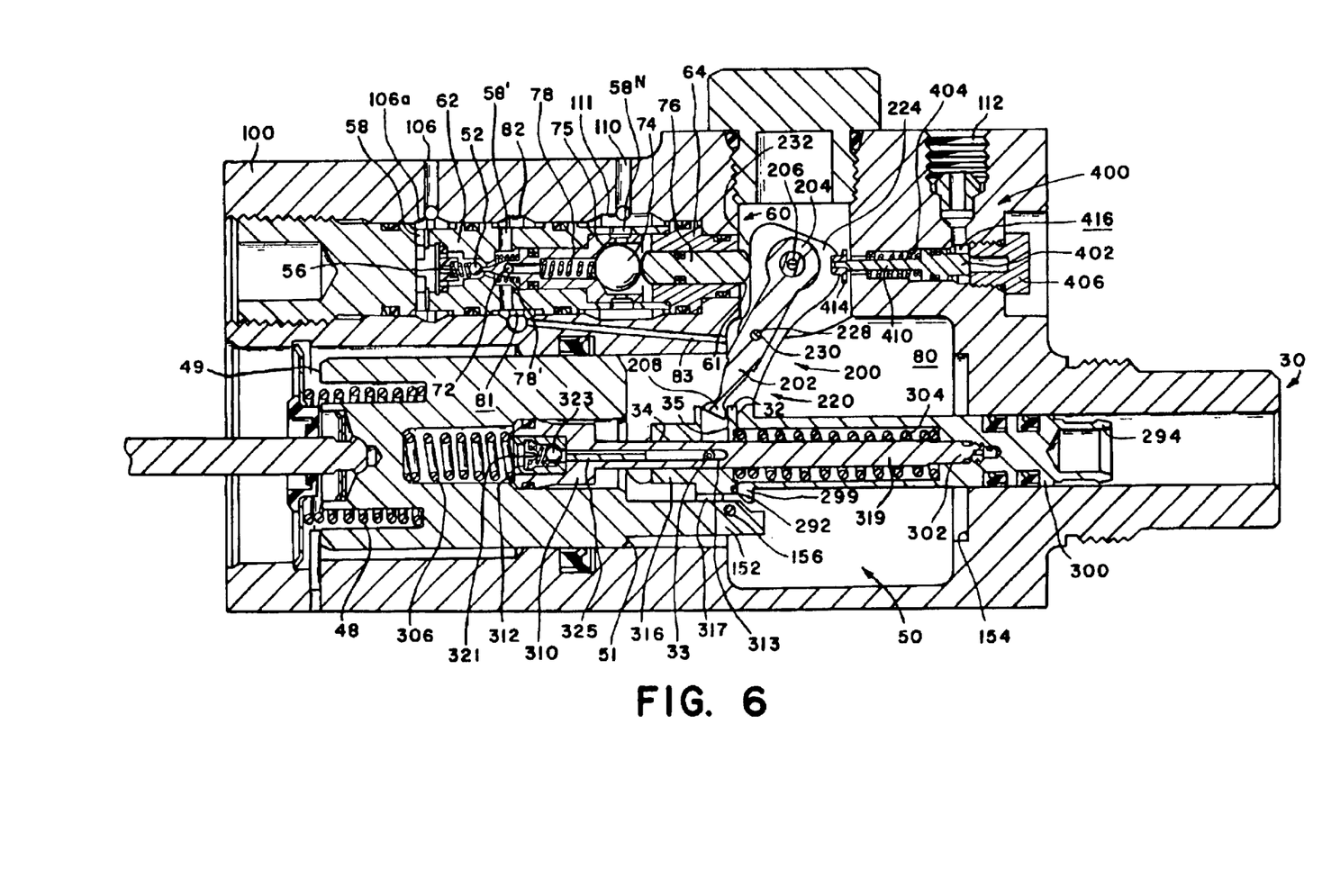
FIG. 6 is a sectional view of the hydraulic brake booster of FIG. 5 wherein a manual input force is added to achieve additional pressurization of fluid supplied to the brake system.

In event that the pressurized fluid from the supply is unavailable, the brake booster 12 is under the control of a manual input force. The manual input force that is applied to brake pedal 28 can be used to pressurize the pistons in master cylinder 13. A manual apply is illustrated in FIG. 6 wherein an input force applied to input member 30 has moved cylindrical member 300 and bracket 32 associated therewith. The manual input force causes end 208 of lever 202 to pivot on pin 206 and impart an actuation force through pin 228 to the second lever 220 to activate the control valve 60. As in a power assist, the actuation force is communicated through cam surface 232 into end 61 of the actuation pin 76 and the actuation pin 76 moves to close relief port 110 by seating ball 74 on seat 75 and moving ball 52 off seat 54 to open communication between the source of pressurized fluid available an inlet port 106 and working chamber 80. However, with no pressurized supply fluid available, the input force on input member 30 continues to move cylindrical member 300 and shaft 302 toward power piston 50 and eventually the first lever 202 engages housing 100 as illustrated in FIG. 6 and thereafter bracket 34 remains stationary and head 310 separates from bracket 34 to allow spring 321 to seat ball 323 on seat 325 to trap fluid in bore 150. With ball 323 on seat 325, a direct link is not provided between the power piston 50 and input member 30 such that the input force applied to pedal 28 is communicated to push rod 11 to pressurize fluid the master cylinder 13 to effect a brake application. The relationship between a manual input force and the resulting output force is illustrated by curve 710.

Figure 7:
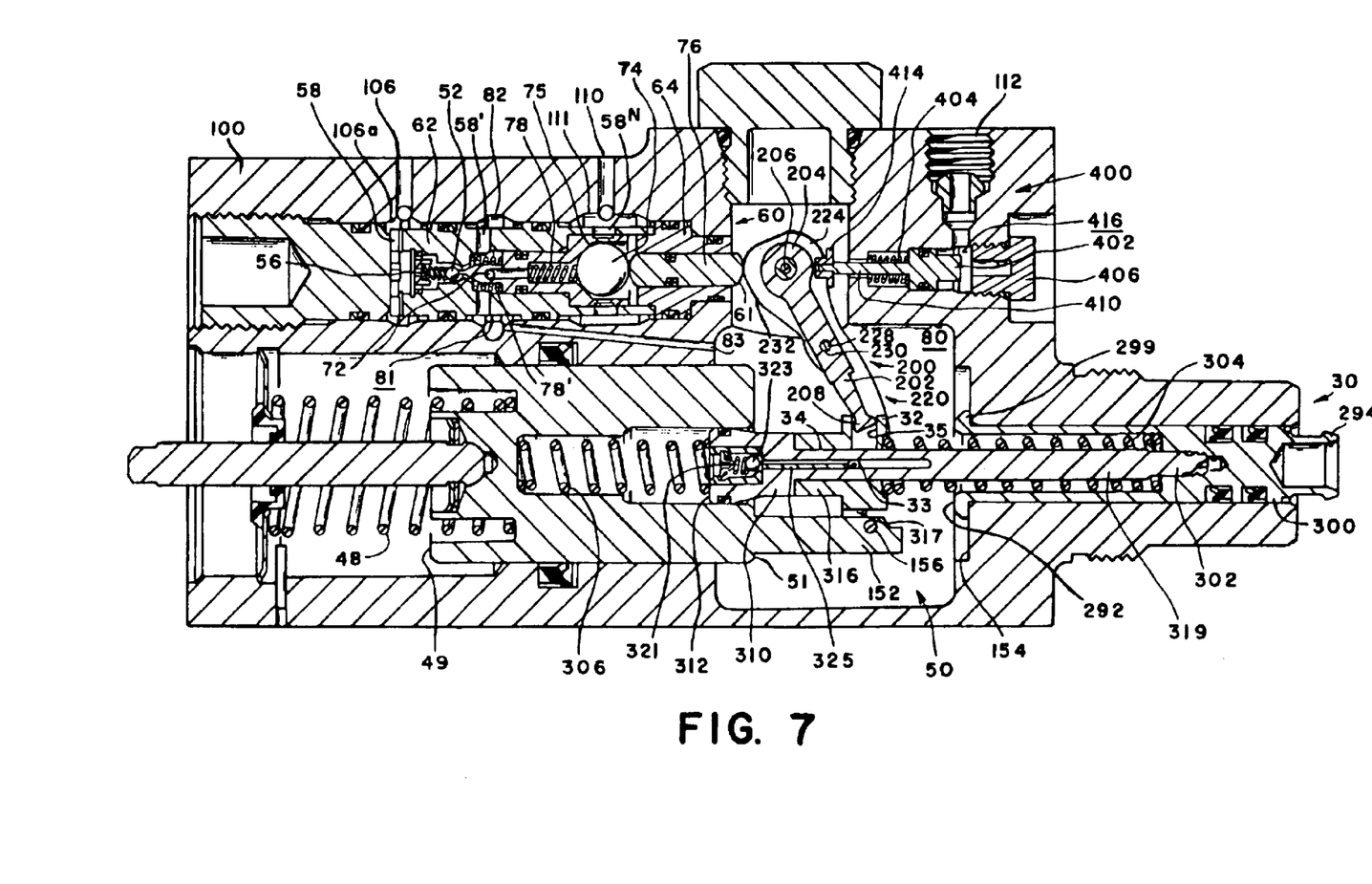
FIG. 7 is sectional view of the hydraulic brake booster of FIG. 2 in a actuation condition developed by an input force derived from an input under the control of an ECU.

The hydraulic booster 12 for the brake system 10 also includes the traction control actuation feature 400 that is under the control of the ECU 40. The ECU 40 has a capability to independently effect a brake application should inputs from the various sensors relating to the operation of the vehicle indicate that a brake application should be performed to meet or maintain desired operating condition for a vehicle. In this situation, the ECU 40 supplies a signal to open normally closed solenoid 39 and allow supply fluid to be communicated to actuation chamber 416 from accumulator 22 or pump 24 by way of conduit 23 and inlet port 112 in housing 100, as illustrated in FIG. 7. With pressurized supply fluid in actuation chamber 416, an actuation force is created on diameter 408 of piston 402 that acts on and after overcoming return spring 404, moves piston 402. This actuation force is communicated through head 414 of piston 402 and directly applied to end 61 of the actuation piston 76 through the first end 224 of the second lever 220. The actuation force moves the actuation piston 76 to sequentially move ball 74 into engagement with seat 75 and to close relief port 110 and then move sleeve 66 for projection 68 to unseat ball 52 and open inlet port 106. With ball 52 away from seat 54, metered pressurized supply fluid is supplied to chamber 81 and communicated to working chamber 80. The metered pressurized fluid in chamber 80 acts on power piston 50 to develop an operational force that is supplied through push rod 11 to pressurize fluid in master cylinder 13. The pressurized fluid from the master cylinder 13 is communicated to an appropriate wheel brake 14,14',18,18' by inputs from the ECU 40 to effect a brake application and attenuate the sensed condition. The braking resulting from the actuation according to a traction control function would follow that portion of curve 702 up to the run out point 704 in FIG. 9. When the ECU 40 determines that the situation has abated, the component return to the positions illustrated in FIG. 2.

The traction control mode for the hydraulic actuator 500 illustrated in FIG. 8 function in a similar manner as the hydraulic actuator 400 in FIG. 7 and a brake application is under the control of ECU 40. To effect a brake application, the ECU 40 supplies actuation chamber 540 with pressurized supply fluid from accumulator 22 or pump 24 by way of opened solenoid valve 39. The pressurized supply fluid acts on piston 522 to move ball 74 into engagement with seat 75 to initially close communication to relief port 110 and thereafter moves sleeve 66 to bring projection 68 into engagement with ball 52 to move ball 52 off seat 54. With ball 52 off seat 54, pressurized supply fluid is metered into chamber 81 for distribution to working chamber 80 by way of passage 83. The metered pressurized fluid in working chamber 80 acts on working piston 50 to develop an operational force that is supplied by push rod 11 to pressurizes fluid in the master cylinder 13. The pressurized fluid from the master cylinder is supplied to an appropriate wheel brake 14,14'18,18' in accordance to a signal from the ECU 40. On receipt of the pressurized supply fluid to the actuation chamber 540, some of the pressurized fluid is directly communicated to working chamber 80 by way of a flow path defined by a space relationship of the second slotted diameter surface 526 in piston 522 and diameter 532 in sleeve 530 and the third diameter surface 528 on piston 522 and the slotted diameter surface 536 of bore 534 in stepped sleeve 530. This initial receipt of pressurized supply fluid from the source produces an initial force that acts on power piston 50 such that functional operation of the hydraulic booster 12 occurs in less time.

We claim:

1. A hydraulic brake booster for use in a brake system having a housing with a first bore separated from a second bore, said first bore retaining a power piston and said second bore retaining a control valve, an input member connected to said power piston and linked to said control valve by a lever arrangement, said lever arrangement is responsive to a first input force that is communicated from the input member for moving said control valve to meter pressurized fluid to a working chamber in said housing, said pressurized fluid in said working chamber acting on said power piston to develop a hydraulic force to pressurize fluid in said first bore that is communicated to wheel brakes in a brake system to effect a corresponding brake application, said input member is characterized by a cylindrical body, a shaft having a head on a first end and axial slot located between said head and threads on a second end, a bracket located on said shaft, said bracket having a radial opening, and a spring located between said bracket and said cylindrical body and on said threads being mated with said cylindrical body said spring urges said bracket into engagement with said head; and wherein said lever arrangement is characterized by a first lever with a first end pivotally secured in said housing by a first pin and a second end located in said radial opening of said bracket, a second lever having a first end and a second end with said first pin passing through a slot in said first end, a second pin extending through said first and second levers to define a fulcrum point for said lever arrangement, and a second spring is located between said power piston and said head such that a return spring force is applied to said bracket and communicated through said fulcrum point to bring said first end of said second lever into engagement with said control valve and said second end of said first lever of said second lever into engagement with said power piston, said first input force being applied through said bracket to said second end of said second lever of said first lever causing said second end to pivot about said first pin and transmit an actuation force through said fulcrum into said second lever to move said first end and activate said control valve whereby metered pressurized fluid is communicated into said working chamber for effecting said brake application, said lever arrangement having a first length defined by a distance between said first pin and said second end on said first lever and a second length defined by a distance between said first pin and said second end of said second lever such that axial movement of said cylindrical body and said power piston is defined by a ratio of said first length to said second length and as a result said hydraulic force is proportional to said input force.

2. The brake booster as recited in claim 1 wherein said first end of said second lever is characterized by a cam surface that engages said control valve such that as said first lever pivots on said first pin the actuation force is balanced between said control valve and said power piston.

3. The brake booster as recited in claim 2 wherein said power piston is characterized by an axial projection that extends into said working chamber and said bracket is characterized by a slot that engages said projection to align said radial opening with said first lever.

4. The brake booster as recited in claim 3 wherein said input member is further characterized by a third pin located that is in said axial slot of said shaft to limit the movement of said bracket with respect to said shaft.

5. The brake booster as recited in claim 4 wherein said power piston is characterized by a stop pin that extends through said axial projection to limit the movement of said bracket with respect to said power piston.

6. The brake booster as recited in claim 5 wherein said body cylindrical body is characterized by a lip that engages said housing to provide a stop to position said cylindrical in a rest position within said working chamber.

7. The brake booster as recited in claim 6 wherein said power piston is characterized by a second axial bore that receives said second spring and said head on said shaft to assist in aligning said cylindrical body with said power piston.

8. The brake booster as recited in claim 7 wherein said input member is further characterized by said shaft having a third bore therein that extends from said head to said axial slot with a seat in said third bore adjacent said head, a ball located in said third bore, a third spring for urging said ball toward said seat and a fourth pin located in said third bore that engages said third pin and said ball to hold said ball off said seat to allow fluid communication between said working chamber and said second axial bore.

9. The brake booster as recited in claim 8 wherein said cylindrical body and power piston move at different rates in response to said first input force such that up to a maximum level for said pressurized fluid in said working chamber said bracket moves away from said power piston and when said maximum level is attained said first lever engages said housing to hold said bracket in a stationary position and thereafter said shaft moves with respect to said third pin to allow said fourth spring to correspondingly move said ball against said seat and close communication between said working chamber said second axial bore to define a solid link between said cylindrical body and power piston such that said first input force applied by the operator to said cylindrical body is added to the hydraulic force to effect a brake application.

10. The brake booster as recited in claim 1 further characterized by a second input force being applied to said first end of said second lever to activate said control valve and meter pressurized fluid to said working chamber for developing said hydraulic force to pressurize fluid in said first bore to effect an independent brake application, and wherein said cylindrical body is characterized by a lip that engages said housing to retain said cylindrical body in said housing as a result of a force acting thereon by said pressurized fluid in said working chamber.

11. The brake booster as recited in claim 10 wherein said power piston is further characterized by an axial projection that extends into said working chamber and a third pin located adjacent an end of said axial projection, and said bracket is further characterized by an axial slot that engages said projection, said bracket remaining stationary within said working chamber until said hydraulic force moves said power piston in said first bore to bring said third pin into engagement with said bracket to pressurize fluid in said first bore and to develop said independent brake application.

12. The brake booster as recited in claim 11 further characterized by said engagement of said third pin with said bracket and further movement of said power piston causing said first lever to pivot on said first pin and impart an auxiliary force through said fulcrum to bring said second end of said second lever into engagement with said power piston.

13. The brake booster as recited in claim 12 further characterized by an actuation chamber in said housing having a piston located therein with a projection that extends into said working chamber and engages said first end of said second lever, said actuation chamber receiving pressurized fluid that acts on said piston to develop said second input force.

14. The brake booster as recited in claim 13 wherein said first end of said second lever is further characterized by a second cam surface such that auxiliary force moves said second end of said second lever into engagement with said power piston without the development of noise.

15. The brake booster as recited in claim 1 further characterized by a second input force being applied to said first end of said second lever to activate said control valve and meter pressurized fluid to said working chamber for developing said hydraulic force to pressurize fluid in said first bore to effect an independent brake application, and wherein said cylindrical body is characterized by a lip that engages said housing to retain said cylindrical body in said housing as a result of a force acting thereon by said pressurized fluid in said working chamber.

* * * * *